(12) United States Patent
Rego et al.

(10) Patent No.: US 9,824,087 B2
(45) Date of Patent: Nov. 21, 2017

(54) METHOD FOR DESIGNING A MOULD FOR CASTING A SEMI-FINISHED OPHTHALMIC LENS BLANK AND COMPUTER PROGRAM PRODUCT FOR CARRYING OUT SAID METHOD

(75) Inventors: Carlos Rego, Charenton-le-Pont (FR); Jerome Moine, Charenton-le-Pont (FR); Matthieu Guillot, Charenton-le-Pont (FR)

(73) Assignee: ESSILOR INTERNATIONAL (COMPAGNIE GENERALE D'OPTIQUE), Charenton-le-Pont (FR)

( * ) Notice: Subject to any disclaimer, the term of this patent is extended or adjusted under 35 U.S.C. 154(b) by 1038 days.

(21) Appl. No.: 14/007,205

(22) PCT Filed: Mar. 22, 2012

(86) PCT No.: PCT/EP2012/055139
§ 371 (c)(1),
(2), (4) Date: Sep. 24, 2013

(87) PCT Pub. No.: WO2012/130734
PCT Pub. Date: Oct. 4, 2012

(65) Prior Publication Data
US 2014/0008825 A1 Jan. 9, 2014

(30) Foreign Application Priority Data
Mar. 31, 2011 (EP) .................................... 11160748

(51) Int. Cl.
*G06F 17/50* (2006.01)
*G06F 17/30* (2006.01)
*B29D 11/00* (2006.01)
*B29C 33/00* (2006.01)

(52) U.S. Cl.
CPC .............. *G06F 17/30* (2013.01); *B29C 33/00* (2013.01); *B29D 11/00413* (2013.01)

(58) Field of Classification Search
None
See application file for complete search history.

(56) References Cited

U.S. PATENT DOCUMENTS 2,890,486 A 6/1959 Crandon
4,693,446 A * 9/1987 Orlosky .............. B29C 33/0038
249/105

(Continued)

OTHER PUBLICATIONS

International Search Report, dated Jul. 3, 2012, from corresponding PCT application.

*Primary Examiner* — Omar Fernandez Rivas
*Assistant Examiner* — Cuong Luu
(74) *Attorney, Agent, or Firm* — Young & Thompson (57) ABSTRACT

A method for designing a mould (120) for casting a semi-finished ophthalmic lens blank, wherein the surface of the mould (120) is designed so that the surface of the mould fits a predetermined closed curve, wherein the predetermined closed curve is representative of the geometry of a gasket (160) to be used in association with the mould (10). A method for assembling a mould assembly (100) and a method for casting a semi-finished ophthalmic lens blank, and a computer program product including software code portions for performing steps of these methods are also described.

18 Claims, 4 Drawing Sheets

(56) References Cited

U.S. PATENT DOCUMENTS

| | | | | |
|---|---|---|---|---|
| 4,874,561 | A * | 10/1989 | Spector | B29C 43/02 249/160 |
| 5,470,892 | A * | 11/1995 | Gupta | B29D 11/00961 264/1.38 |
| 5,547,618 | A | 8/1996 | Magne | |
| 5,689,324 | A * | 11/1997 | Lossman | B29D 11/00019 264/1.38 |
| 6,068,464 | A * | 5/2000 | Su | B29C 31/006 249/117 |
| 6,103,148 | A * | 8/2000 | Su | B29D 11/00413 264/1.38 |
| 6,222,619 | B1 * | 4/2001 | Herron | G01N 33/54373 356/317 |
| 6,228,289 | B1 * | 5/2001 | Powers | B29D 11/00442 264/1.36 |
| 2001/0038890 | A1 * | 11/2001 | Buazza | B29D 11/00442 428/1.1 |
| 2001/0047217 | A1 * | 11/2001 | Buazza | B29D 11/00442 700/116 |
| 2005/0104240 | A1 | 5/2005 | Jethmalani et al. | |
| 2006/0065989 | A1 * | 3/2006 | Druffel | B29C 35/0805 264/1.32 |
| 2008/0273169 | A1 * | 11/2008 | Blum | G02C 7/06 351/159.44 |
| 2009/0279049 | A1 * | 11/2009 | Wade | B29C 45/73 351/159.01 |
| 2016/0187672 | A1 * | 6/2016 | Tucker | B29D 11/00903 351/159.3 |

\* cited by examiner

METHOD FOR DESIGNING A MOULD FOR CASTING A SEMI-FINISHED OPHTHALMIC LENS BLANK AND COMPUTER PROGRAM PRODUCT FOR CARRYING OUT SAID METHOD

FIELD OF THE INVENTION

The invention relates to a method for designing a mould for casting a semi-finished ophthalmic lens blank as well as a method for assembling a mould assembly for casting a semi-finished ophthalmic lens blank and a method for casting a semi-finished lens blank. The invention also refers to a computer program product for carrying out said methods

BACKGROUND OF THE INVENTION

There is known, for example from U.S. Pat. No. 5,547,618, a method for manufacturing optical lenses comprising the following steps.

Figure 1:
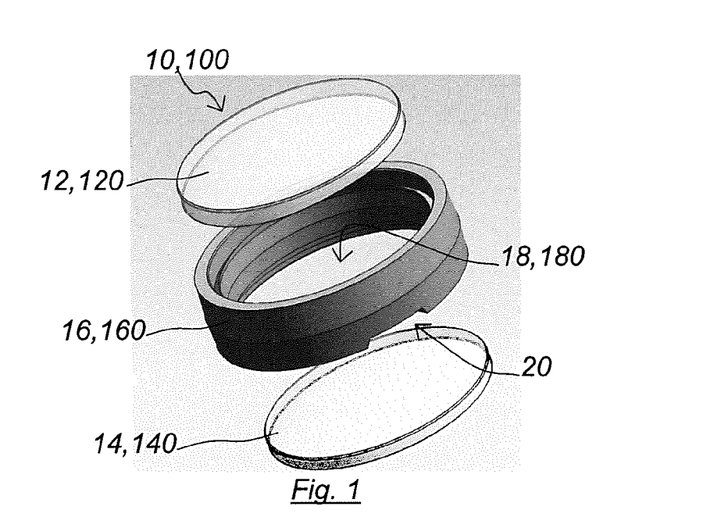
FIG. 1 shows a mould assembly in exploded view.
Figure 2:
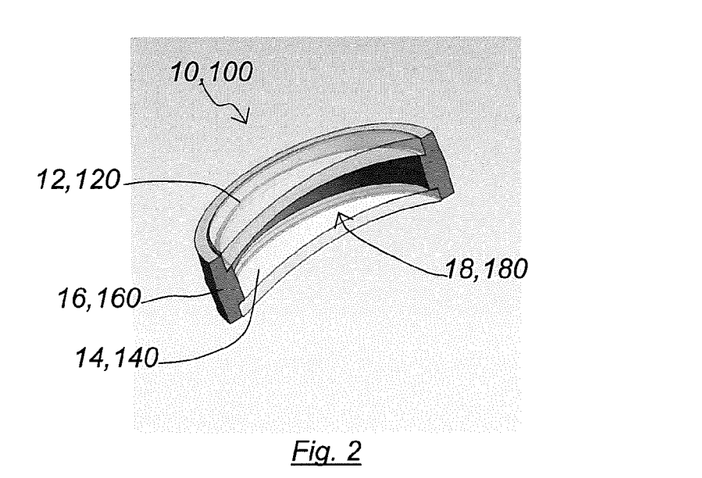
FIG. 2 shows the mould assembly of FIG. 1 in cutaway view.

First, a mould assembly 10 (or molding assembly) is assembled, comprising two moulds 12, 14 (or mould shells) and a gasket 16 (or sealing member). The mould assembly thus defines a molding cavity 18.

Thus, in the present description, a mould is one hollow part of the mould assembly, which forms with the gasket and eventually another mould the moulding cavity.

Next, the cavity 18 in the mould assembly 10 is filled with molding material. Conventionally this is done by pouring the molding material into the molding cavity through an opening 20 provided for this purpose in the gasket 16 at the periphery of the moulds 12, 14.

Then, the molding material is polymerized.

It is known in this kind of process to define the surface of at least one mould using an optimization process so as to ensure that the surface of the optical lens has desired optical properties. The inputs to this optimization process are geometrical properties of the surface and/or optical properties of the optical lens to be molded and the areas of the surface where these optical properties must be satisfied.

Figure 3:
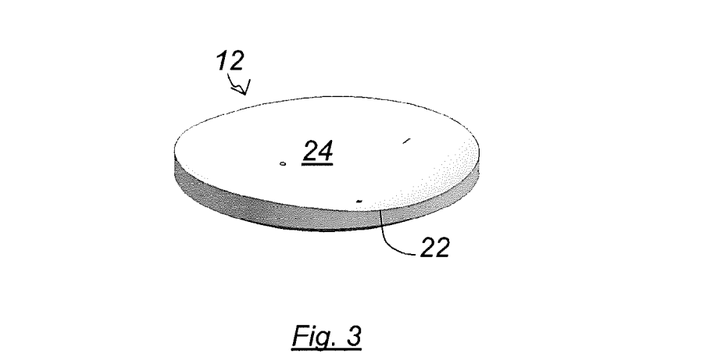
FIGS. 3 to 6 show examples of mould that can be used in the mould assembly of FIGS. 1 and 2.

Nevertheless, using such an optimization process may lead to very complex surfaces. In particular, as shown in FIG. 3, the edge 22 of the surface 24 of the mould 12 defining a cavity may have irregular shapes. In particular, this edge 22 may present waves and/or be uneven. As a consequence, manufacture of a gasket 16 adapted to the mould 12—i.e. adapted to ensure sealing of the cavity 18 during the molding process—is very complex. Indeed the shape of the gasket 16 must be adapted to the edge 22 to ensure sealing of the cavity 18.

Moreover, the surface 24 of the mould is defined by an optimization process for each type of optical lens. Thus the edge 22 of the surface 24 is different for each mould 12 defined this way. Consequently a special gasket must be produced for each optical lens. This leads to a great number of different gaskets and thus induces significant costs.

SUMMARY OF THE INVENTION

The object of the present invention is to alleviate at least partly the above mentioned drawbacks.

This object is achieved with a method for designing a mould for casting a semi-finished ophthalmic lens blank, wherein the surface of the mould is designed so that said surface of the mould substantially fits a predetermined closed curve representative of the geometry of a gasket to be used in combination with the mould.

The predetermined closed curve is representative of the geometry of the gasket to be used in combination with the mould shall be understood as follows:

in the case where the mould does not comprise a facet, the predetermined closed curve corresponds to the curve along which the gasket will bears on the mould.

in the case where the mould does comprise a facet, the predetermined closed curve merely corresponds to a closed curve which will be integrally comprised inside the closed curve along which the gasket will bears on the facet.

In both cases, it is thus ensured that the casting cavity formed by the mould and the gasket may be hermitically closed.

Preferred embodiments comprise one or more of the following features:

said surface of the mould is designed using an optimization process, said predetermined closed curve being a constraint for the optimization process;

the surface of the mould is complex and data representative of said complex surface are used as input of the optimization process;

said predetermined closed curve is comprised in one plane;

the method comprises a step of designing a facet of the mould which extends outwardly from said surface;

the facet is comprised in said plane;

the predetermined closed curve is circle-shaped, ellipse-shaped, rectangle-shaped or square-shaped; and the height of all points of said predetermined closed curve relative to the bottom of the mould is equal.

The invention also refers to a method for assembling a mould assembly comprising the steps of:

providing a mould for casting a semi-finished ophthalmic lens blank designed according to the method described above according to any of its combination, providing a gasket, the predetermined closed curve used for designing the mould being representative of said gasket, assembling the mould and the gasket.

The invention further relates to a method for casting a semi-finished lens blank comprising the steps of:

assembling a mould assembly according to the method described above;

casting said semi-finish lens blank in a cavity formed in the mould assembly.

Finally, the invention refers to a computer program product comprising one or more stored sequence of instruction that is accessible to a processor and which, when executed by the processor, causes the processor to carry out the steps of the methods described above.

Further features and advantages of the invention will appear from the following description of embodiments of the invention, given as non-limiting examples, with reference to the accompanying drawings listed hereunder.

DETAILED DESCRIPTION OF THE INVENTION

First, several definitions are given.

As is known, each point of an aspherical surface has an altitude z. For each point of the surface, a minimum curvature $CURV_{min}$ is given by the formula:

$$CURV_{min} = \frac{1}{R_{max}}$$

where $R_{max}$ is the local maximum radius of curvature, expressed in metres and $CURV_{min}$ is expressed in dioptres.

Similarly, a maximum curvature $CURV_{max}$ can be defined at any point on an aspherical surface by the formula:

$$CURV_{max} = \frac{1}{R_{min}}$$

where $R_{min}$ is the local minimum radius of curvature, expressed in metres and $CURV_{max}$ is expressed in dioptres.

It can be noticed that when the surface is locally spherical, the local minimum radius of curvature $R_{min}$ and the local maximum radius of curvature $R_{max}$ are the same and, accordingly, the minimum and maximum curvatures $CURV_{min}$ and $CURV_{max}$ are also identical.

From these expressions of the minimum and maximum curvatures $CURV_{min}$ and $CURV_{max}$, the minimum and maximum spheres labelled $SPH_{min}$ and $SPH_{max}$ can be deduced according to the following formulas:

$$SPH_{min} = (n-1)*CURV_{min} = \frac{n-1}{R_{max}} \text{ and } SPH_{max} = (n-1)*CURV_{max} = \frac{n-1}{R_{min}}$$

where n is the index of the constituent material of the semi-finished ophthalmic lens blank to be cast.

As is known, a mean sphere $SPH_{mean}$ at any point on an aspherical surface can also be defined by the formula:

$$SPH_{mean} = \frac{1}{2}(SPH_{min} + SPH_{max})$$

A cylinder CYL is also defined by the formula $CYL = SPH_{max} - SPH_{min}$.

The characteristics of any complex face of the lens may be expressed by means of the local mean spheres and cylinders. A surface can be considered as locally aspherical when the cylinder is at least 0.25 diopters.

Keeping this definition in mind, a method for designing a mould 120 for casting a semi-finished ophthalmic lens blank is disclosed in the following.

A semi-finished ophthalmic lens blank comprises a predetermined finish surface and a non finish surface designed to be machined. The semi-finished ophthalmic lens blank must thus comprise a surface with optical and/or geometric properties to facilitate subsequent machining of the semi-finish lens blank to produce an ophthalmic lens with required optical properties adapted to the wearer's prescriptions.

According to the invention, the surface of the mould is designed so that said surface of the mould substantially fits a predetermined closed curve, which predetermined closed curve is representative of the geometry of a gasket to be used in combination with the mould. In other words, the predetermined closed curve is integrally comprised in the surface of the mould or, at least, the distance between each point of the predetermined closed curve and the finally designed surface of the mould is less than 0.1 mm, preferably less than 0.05 mm.

Thus, the 3D geometry of a closed curve on the surface is controlled. It is thus easier to design an adapted gasket 160 which will ensure that the molding cavity 180 to be filled with casting material is sealed, the gasket being designed so as to be in contact with the mould along said predetermined closed curve in case the mould does not comprise a facet.

Accordingly the predetermined closed curve is preferably designed to be at or near the periphery of mould 120. In other words, the closed curve is preferably designed so that all its points are at a distance from the edge 125 of the cavity of the mould 120 comprised between 0 and 10 mm.

It is also possible to use the same predetermined closed curve for designing a plurality of different moulds. This is also very advantageous because it means that only one gasket can be used for these different moulds, wherein according to the prior art discussed above, a different gasket had to be designed for each mould.

According to the above explanations, it is clear that the predetermined closed curve may be determined before the designing of the surface of the mould, based on the geometry of a gasket to be used in combination with the mould 120. However it is also possible to design the surface of the mould to fit a predetermined closed curve and then to design a gasket adapted to be used in combination with the mould 120 based on the predetermined closed curve.

When the surface of the mould is complex (i.e. when the mould is adapted to cast a complex semi-finish ophthalmic lens blank), the surface of the mould may in particular be designed using an optimization process. A complex surface is any surface that is not spherical. Progressive and regressive surfaces may be cited here as non-limiting examples of complex surfaces. By "progressive surface" is meant a surface of the mould adapted to cast a semi-finish ophthalmic lens blank with a continuous aspheric surface having a far vision zone, a near vision zone and a zone of increasing mean sphere value connecting the far vision and near vision zones. By "regressive surface" is meant a surface of the mould adapted to cast a semi-finish ophthalmic lens blank with a continuous aspheric surface having a far vision zone, a near vision zone and a zone of decreasing mean sphere value connecting the far vision and near vision zones.

When an optimization process is used to define the surface of the mould, the predetermined closed curve may be used as an input parameter of the optimization process. However, it is known that the result of an optimization does not meet all the criteria input to the optimization process.

Indeed, the result of an optimization process is by definition a compromise between the different criteria used as input to the optimization process. Thus these criteria are most of the time not perfectly met but merely approached.

Thus it is preferred to use the predetermined closed curve as a constraint of the optimization process so as to ensure that the optimized surface fits the predetermined closed curve.

In other words, the optimization process is used so that the surface of the mould does respect, as well as possible, the desired optical design, as known per se by the man ordinarily skilled in the art, while ensuring that the optimized surface geometry strictly matches the predetermined closed curve.

As known per se by the man ordinarily skilled in the art, inputs of an optimization process are geometrical properties of the mould and/or desired optical properties of the semi-finish ophthalmic lens blank to be cast in the mould. Mean sphere distribution and cylinder distribution of the semi-finish ophthalmic lens blank may be cited here as non-limiting examples of such optical criteria.

The predetermined closed curve can advantageously be comprised in one single plane. Indeed, in this case, the corresponding gasket may be designed so that the bearing area of the gasket is comprised in a plane. The bearing area is adapted to be in contact on the mould along the predetermined closed curve. Such a gasket is easier and cheaper to produce than a complex gasket comprising a bearing surface with waves or more complex 3D geometry.

In particular non-limiting examples, the predetermined closed curve may be circle-shaped, ellipse-shaped, rectangle-shaped or square-shaped. Indeed, the more regular the closed curve is, the more regular the gasket will be. As a consequence, the gasket is still easier and cheaper to manufacture.

Figure 6:
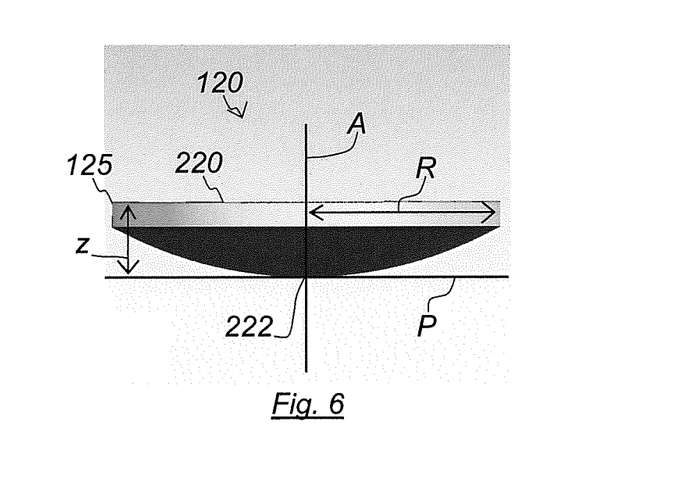
Figure 7:
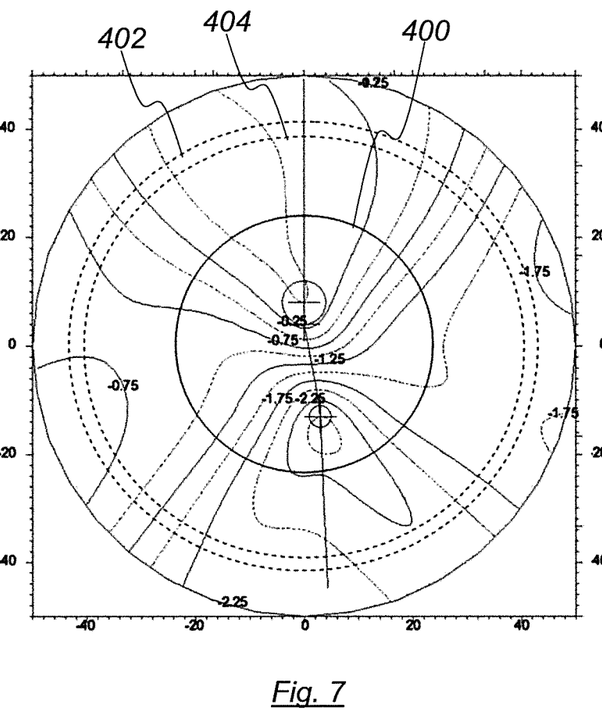
FIG. 7 shows the distribution of mean sphere over one surface of a mould adapted for casting a semi-finished ophthalmic lens blank according to the prior art.
Figure 8:
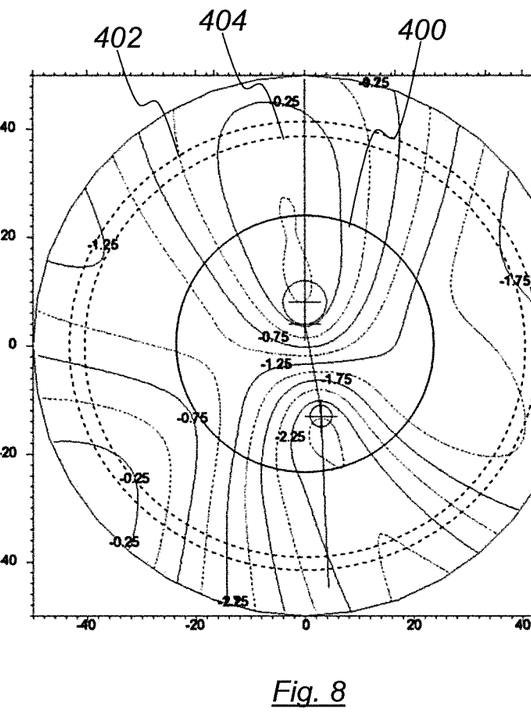
FIG. 8 shows the distribution of mean sphere over one surface of a mould adapted for casting a semi-finished ophthalmic lens blank according to the invention.
Figure 9:
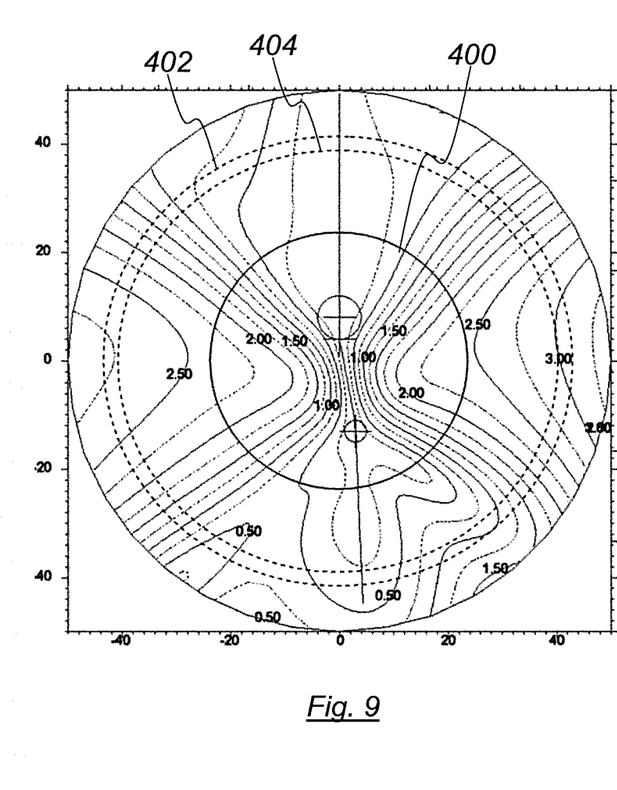
FIG. 9 shows the distribution of cylinder over one surface of a mould adapted for casting a semi-finished ophthalmic lens blank according to the prior art.
Figure 10:
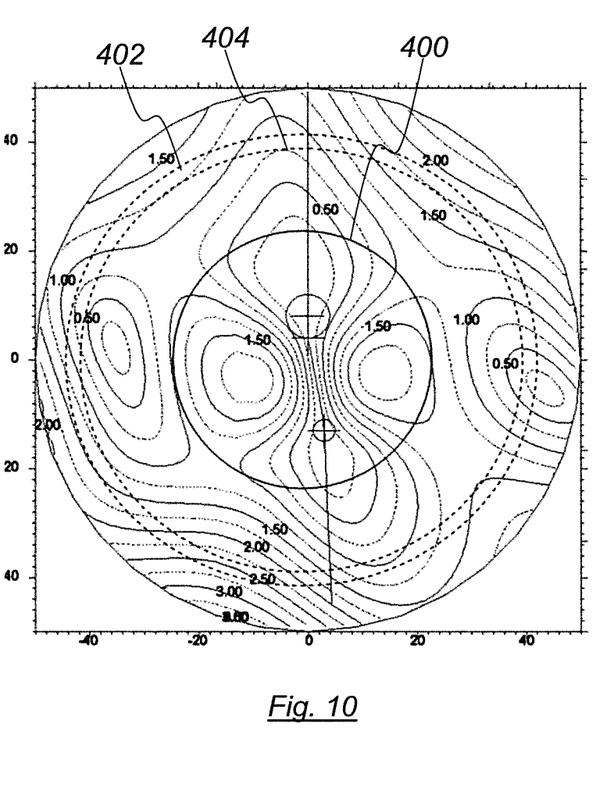
FIG. 10 shows the distribution of cylinder over one surface of a mould adapted for casting a semi-finished ophthalmic lens blank according to the invention.

It is particularly useful for the height z of all the points of the predetermined closed curve 220 relative to the bottom 222 of the mould 120 to be equal. Indeed, in this case, the geometry of the gasket is particularly simple so that the gasket is cheaper to manufacture. As shown in FIG. 6, the height z of a point is defined by the distance between said point and the plane P which is tangential to mould 120 at the bottom 222 thereof.

It has been found that it was also advantageous to use the suggested designing method to design casting mould with a facet.

Figure 4:
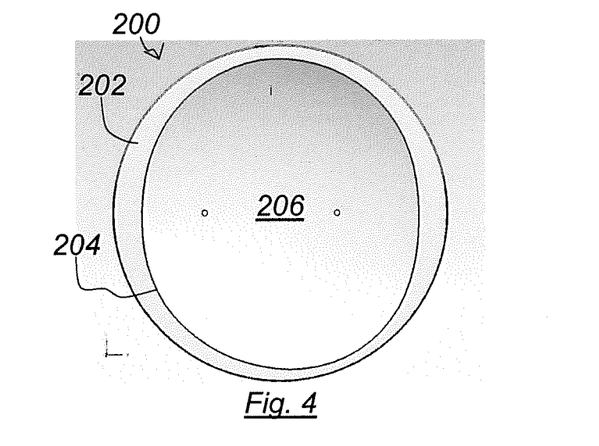

FIG. 4 shows an example of a mould 200 with a facet 202. It is known to design this facet 202 according to a plane, so that a gasket will easily bear on the plane facet. However, in this case, the edge 204 of the cavity 206 in the mould 200—which edge 204 corresponds to the intersection of the plane in which facet 202 extends and the cavity 206—is not controlled during the designing of the mould, in particular when the designing of the mould is carried out by an optimization process.

It has been noticed by the inventors that in the case of a mould 200 with a facet 202 the use of known optimization processes may lead to casting semi-finished ophthalmic lens blanks with poor geometrical properties. In other words, the semi-finished ophthalmic lens presents useful and necessary optical properties in a limited area of the semi-finished ophthalmic lens blank. In particular, it has been noticed that designing mould for casting regressive semi-finished ophthalmic lens blanks using known optimization processes may lead to semi-finished ophthalmic lens blanks which have a loss of horizontal optical capacities. In other words, as shown in FIG. 4, the optically usable area of the semi-finish lens blank which would be cast in the mould 200, would be substantially elliptical shaped, the optically usable area being higher (in the vertical direction) than wide (in the horizontal direction). The optically usable area corresponds to the surface of the mould cavity 206 delimited by the edge 204 of the facet 202. This optically usable area does not comprise the surface of the facet 202.

This shape of the optically useable area is a real drawback since spectacles are nowadays wider (in the horizontal direction) than high (in the vertical direction).

The same kind of loss of optical capacities occurs in the vertical direction when casting progressive semi-finished ophthalmic lens blanks according to the prior art. In other words, the progressive ophthalmic semi-finished lens blanks cast in a mould according to the prior art would have a substantially elliptical shape which is larger than high. This may also be a drawback to design spectacle lenses with a particular shape.

However, using the method of the invention to design the mould 300—in particular using as constraint of an optimization process a predetermined closed curve—it has been ensured that the mould 300 may be used to cast a semi-finished ophthalmic lens blank with good optical capacities in a horizontally or vertically larger area of the semi-finished ophthalmic lens blank, depending on the type (in particular progressive or regressive) of complex surface of the semi-finished lens blank to be cast.

Figure 5:
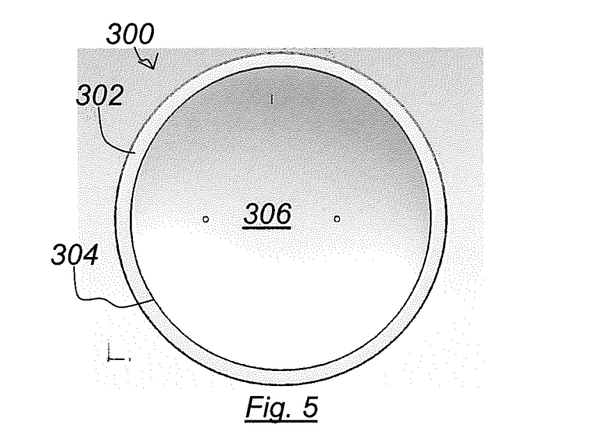

This can be seen from FIGS. 4 and 5 which illustrate that the optically usable area of the mould 300 designed according to the invention is greater than the optically usable area of the mould 200 according to the prior art. Indeed, in the case of these two moulds 200, 300, the optically usable area corresponds to the surface of the cavity 206, 306 delimited by the edge 204, 304 of the facet 202, 302.

In the case of a mould comprising a facet, the predetermined closed curve may notably correspond to the desired shape of the edge 304 of the mould to be designed from which the facet extends outwardly. As illustrated, the facet may be defined by the desired shape of the edge 304 (i.e. from the predetermined closed curve) from which it extends and a constant height of each point of this edge with regard to the bottom. In this case, the gasket to be used in combination with the mould bears on the facet along a closed curve, which closed curve is defined outside of the predetermined closed curve on the surface of the mould.

FIGS. 7, 8, 9 and 10 further show the differences between a mould designed according to the prior art and a mould designed according to the method of the invention. It should be noticed that the same kind of differences exist between the semi-finish ophthalmic lens blanks cast with the mould designed according to the prior art and the semi-finish ophthalmic lens blanks cast with the mould designed according to the invention.

On FIGS. 7, 8, 9 and 10, the black circle 400 delimits the central area of the mould corresponding to the preferred optical area of the semi-finished lens blank cast therewith, through which a wearer of the lens would look most of the time. The two dotted circles 402 and 404 delimit the part of the mould where the surface of the mould fits a predetermined closed curve. In the present case, the points of the predetermined closed curve had the same height with regard to the bottom of the mould, the predetermined closed curve being circle-shaped.

These figures show that the surfaces of two moulds have quite similar cylinder and mean sphere distributions in their central area corresponding to the central preferred optical area of the cast semi-finish lens blank.

However, the further from the center, the greater are the differences in mean sphere and cylinder distributions over the two surfaces. This results from the fact that the optimisation process according to the invention makes two different compromises:

to ensure that the surface matches the 3D predetermined closed curve, and
to ensure the optical properties of the semi-finished ophthalmic lens blank, whereas according to the prior art, only the optical properties are taken into account.

The suggested method for designing a mould can be used in a method for assembling a mould assembly 100 comprising the steps of:

designing a first mould 120 for casting a semi-finished ophthalmic lens blank using the method described above,
providing a gasket 160, the predetermined closed curve used for designing the mould being representative of the gasket 160
assembling said first mould 120 with the gasket 160 and eventually a second mould 140 to define a hermitically closed casting cavity 180.

It is then possible to cast a semi-finish lens blank in said casting cavity 180 formed in the mould assembly 100, for example by:

filing the casting cavity 180 with casting material, and
polymerizing said casting material in said casting cavity 180.

The first step above may be replaced by a step of providing a first mould 120 for casting a semi-finished ophthalmic lens blank designed using the method described above.

The casting cavity formed by the mould(s) 120, 140 and the gasket 160 may in particular be adapted for casting a complex semi-finished ophthalmic lens blank, in particular a progressive or a regressive semi-finished ophthalmic lens blank.

At least one mould may comprise a facet, on which the gasket bears.

The casting material used may be in particular a thermosetting or thermohardening material. The mould may be made of glass or metal, in particular chromium steel or nickel.

At least some steps of the methods described above may be performed using a computer program product comprising software code portions designed for performing said steps of the method described above when said product is run on a computer.

The invention has been described with reference to preferred embodiments. However, many variations are possible within the scope of the invention.

The invention claimed is:

1. A method for designing a mould for casting a semi-finished ophthalmic lens blank, the method comprising the steps of:

determining a closed curve representative of a geometry of a gasket to be used in combination with the mould with the closed curve being at a periphery of mould, wherein the determined closed curve corresponds to a desired shape of an edge of the mould;
using an optimization process with desired optical properties of the semi-finished ophthalmic lens blank to be cast in the mould and the determined closed curve as inputs of the optimization process, designing a surface of the mould so that said surface of the mould is regressive and substantially fits the determined closed curve with a distance between each point of the determined closed curve and said surface of the mould being less than 0.1 mm, wherein a distance between an outer edge (304) of an optically usable cavity area (306) of the mould and an edge of an outermost perimeter (302) of the mould is constant; and
manufacturing the mould with the designed surface.

2. The method according to claim 1, wherein the surface of the mould is complex and data representative of said complex surface are used as input of the optimization process.

3. The method according to claim 1, wherein said closed curve is comprised in one plane.

4. The method according to claim 1, comprising a step of designing a facet of the mould which extends outwardly from said surface.

5. The method according to claim 4, wherein said closed curve is comprised in one plane, and the facet is comprised in said plane.

6. The method according to claim 1, wherein the height of all points of said closed curve relative to the bottom of the mould is equal.

7. A method for assembling a mould assembly comprising the steps of:

providing a mould for casting a semi-finished ophthalmic lens blank designed according to claim 1,
providing a gasket having the closed curve used for designing the mould,
assembling the mould and the gasket.

8. A method for casting a semi-finished lens blank comprising the steps of:

assembling a mould assembly according to the method of claim 7;
casting said semi-finish lens blank in a casting cavity formed in the mould assembly.

9. A non-transitory computer program medium comprising one or more stored sequence of instruction that is accessible to a processor and which, when executed by the processor, causes the processor to carry out the steps of claim 1.

10. The method according to claim 2, wherein said closed curve is comprised in one plane.

11. The method according to claim 2, comprising a step of designing a facet of the mould which extends outwardly from said surface.

12. The method according to claim 3, comprising a step of designing a facet of the mould which extends outwardly from said surface.

13. The method according to claim 1, wherein the height of all points of said closed curve relative to the bottom of the mould is equal.

14. The method according to claim 2, wherein the height of all points of said closed curve relative to the bottom of the mould is equal.

15. The method according to claim 5, wherein the height of all points of said closed curve relative to the bottom of the mould is equal.

16. A method for assembling a mould assembly comprising the steps of:

providing a mould for casting a semi-finished ophthalmic lens blank designed according to claim 1,
providing a gasket, having the closed curve used for designing the mould,
assembling the mould and the gasket.

17. A method for assembling a mould assembly comprising the steps of:

providing a mould for casting a semi-finished ophthalmic lens blank designed according to claim 2, providing a gasket, having the closed curve used for designing the mould, assembling the mould and the gasket.

18. A method for assembling a mould assembly comprising the steps of:

providing a mould for casting a semi-finished ophthalmic lens blank designed according to claim 5, providing a gasket, having the closed curve used for designing the mould, assembling the mould and the gasket.

* * * * *